(12) United States Patent
Hwang et al.

(10) Patent No.: US 6,351,285 B1
(45) Date of Patent: Feb. 26, 2002

(54) MOTION CORRECTION DEVICE FOR MOVING IMAGES

(75) Inventors: Jung Hyun Hwang; Chul Ho Lee, both of Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 08/917,702

(22) Filed: Aug. 26, 1997

(30) Foreign Application Priority Data

Sep. 23, 1996 (KR) .............................. 96-41569

(51) Int. Cl.$^7$ .............................................. H04N 5/225
(52) U.S. Cl. ...................... 348/335; 348/337; 348/208; 348/340
(58) Field of Search ................. 348/208, 335, 348/336, 337, 338, 339, 340, 341, 343; 359/629, 631, 638, 639, 640; 358/481, 493, 489, 495

(56) References Cited

U.S. PATENT DOCUMENTS

| | | | | |
|---|---|---|---|---|
| 4,330,797 A | * | 5/1982 | Yokokawa et al. | 348/343 |
| 4,544,250 A | * | 10/1985 | Tanaka et al. | 348/341 |
| 5,335,114 A | * | 8/1994 | Suzuki | 359/629 |
| 5,465,247 A | * | 11/1995 | Kobayashi | 369/109 |
| 5,621,424 A | * | 4/1997 | Shimada et al. | 345/8 |
| 5,726,670 A | * | 3/1998 | Tabata et al. | 345/7 |
| 5,793,473 A | * | 8/1998 | Koyama et al. | 359/629 |
| 5,903,307 A | * | 5/1999 | Hwang | 348/208 |
| 5,982,343 A | * | 11/1999 | Iba et al. | 345/8 |

FOREIGN PATENT DOCUMENTS

KR 92-27157 3/1997

* cited by examiner

*Primary Examiner*—Wendy Garber
*Assistant Examiner*—Mitchell White
(74) *Attorney, Agent, or Firm*—Jones Volentine, LLC

(57) ABSTRACT

A motion correction device for images recorded by a camcorder from incident light having an incident direction. The device comprises at least one of horizontal and vertical component pick-ups. Each component pick-up comprises a converter for converting light into electrical signals, and a thin transmitter-reflector for transmitting a portion of the incident light at substantially the incident direction and for reflecting a remaining portion of the incident light at a range of other directions such that substantially all the reflected light impinges on the converter. The thin transmitter-reflector may be a curved transmission mirror for focusing the reflected light on the converter or a flat transmitter-reflector with a condenser disposed between the thin transmitter-reflector and the converter for focusing the reflected light onto the converter.

10 Claims, 7 Drawing Sheets

MOTION CORRECTION DEVICE FOR MOVING IMAGES

BACKGROUND OF THE INVENTION

1. Field of the Invention

The present invention relates to a motion correction device for a camcorder (camera recorder), and more particularly, to the one-dimensional image component pick-up unit for correcting an unstable image from a camcorder caused by unsteady hands.

2. Description of the Related Art

Detection of a motion vector from a dynamic image signal is an essential technique in the compression, recognition, stabilization, etc. of an image. When a portable video camera is used in conjunction with a VCR (videocassette recorder) to take a picture, an image input to the camera is likely to be unstable and shaking, especially when the user is walking or in a moving vehicle. A common problem of camcorders is that when a picture is highly magnified, the instability caused by unstable hands is more pronounced.

A solid state pick-up unit is widely used as an input device of a camcorder. The solid state pick-up unit is a two-dimensional image pick-up unit made from a semiconductor chip which does not use electron beams. There are two types of solid state pick-up units—a MOS type which uses a metal oxide semiconductor (MOS) transistor in a light receiver, and a CCD (charge coupled device) type.

In the following, an existing image correction system will be explained in conjunction with the accompanying drawings. FIG. 1 is a block diagram showing a conventional image correction system, and FIG. 2 is a conceptual diagram showing a conventional method of detecting a motion vector for an image by detecting a pair of one-dimensional vector components.

As shown in FIG. 1, the conventional image correction system for stabilizing an image comprises a CCD imager 11 (a solid state pick-up unit) which picks up an input image from incident light that has passed through an optical system, scans the image electronically within the solid state device, and converts the image into electrical signals. An analog/digital converter 12 (referred to as an A/D converter hereinafter) converts the analog signals output from the CCD imager 11 into digital signals. A camera signal processing unit 13 converts a signal output from the A/D converter into color and brightness signals. A motion vector detecting unit 14 computes a motion vector from the signal output from the A/D converter 12. A memory control unit 15 receives the motion vector output from the motion vector detecting unit 14 to control the position of pixels in the image. A field memory 16 holds a field unit (or a frame unit) of color and brightness data from the camera signal processing unit 13 and, under the control of the memory control unit 15, outputs a stabilized image signal. A digital/analog converter 17 (referred to as a D/A converter hereinafter) converts the corrected color/brightness signals from the field memory 16 into an analog image signal to be recorded.

In such an image correction system, covariance values are calculated between image data selected from two sequential images, and a motion vector is determined based on the point where the minimum covariance value occurs.

In general, a block matching algorithm is used to calculate the covariance value. Performance of the motion vector correction is impaired for the time it takes to apply the block matching algorithm. In order to completely calculate the correction under the constraints of real-time processing, it has been suggested that various techniques be used, such as pyramid searching, logarithmic searching, and so on. A two-dimensional block matching algorithm, however, entails a rapid increase in the number of arithmetic operations with an increase in the number of pixels to be considered. Furthermore, when a subset of pixels from the image is considered, the block matching algorithm is likely to produce erroneous results such as detecting a motion correction vector at a local minimum, which stabilizes only a portion of the image.

As shown in FIGS. 2(A) and 2(B), a general method has also been used which extracts one-dimensional components of the motion correction vector by projecting the image pattern onto a horizontal axis and a vertical axis, and computing the horizontal and vertical components of the correction vector separately.

After an image pattern has been projected in the directions of the horizontal and vertical axes, the projected result is compared with the projected result of the preceding image pattern to calculate one-dimensional covariance values. A displacement quantity between the two fields is determined from the point where the minimum covariance value results. Let an x and y coordinate system represent horizontal and vertical axes, respectively, of an image. Assuming that M is the number of horizontal pixels in each line of an image, and that N is the number of lines of an image, the horizontal covariance value, for example, can be calculated by an equation such as the following:

$$C(u) = \sum_{x=S}^{M-S} |P_h'(x+u) - P_h(x)| \quad (1)$$

where $P_h'$ and $P_h$ are line memories into which the preceding and the present image horizontal component data are accumulated, respectively. The variable u $\{u|-S<u<S\}$ is an integer within a searching distance ±S, and it represents a displacement variable as a number of pixels. If a value of the variable u results in the minimum value of C(u), that value of u is considered to be the optimum horizontal displacement of an image. A similar computation is done for the vertical component. Compared with a two-dimensional matching algorithm, a one-dimensional signal matching algorithm applied to each of two axes x and y enables the calculation of a motion vector using fewer arithmetic operations, even when there is a large displacement between images.

The one-dimensional signal matching algorithm, however, also has a time restraint. The calculation of covariance should be finished before the raster scanning of the next field begins, yet the projection of the present field image data can not be completed until the raster scanning of a previous input image comes to an end. Further, an input pixel should be converted into a low quantified level (a binary signal, etc.) in order to economize on the memory used to accumulate the projection. Also, the determination of a threshold value in the conversion of pixels into a binary signal and the extraction of contours of an image, can lead to the loss of some pixel data. In addition, two pairs of line memories are required, of which one pair has N registers, the number of lines of an input image, and the other pair has M, the number of horizontal pixels. Finally, a complete one-dimensional signal matching algorithm must be implemented in the circuitry.

In order to solve the above-mentioned problems, Korean Patent Application No. 95-27157 has disclosed a device and method for detecting a motion vector of a camcorder.

Besides a main CCD, the disclosed device uses separate image pick-up units to obtain one-dimensional component data at a high speed, uses a pipeline processing method to enable the rapid calculation of covariance values between successive image component data, and uses fewer line memories to allow for simpler circuitry.

FIG. 3 is a drawing which shows the principles of picking up an image through an image pick-up unit according to a conventional embodiment. FIG. 4 is a drawing which shows horizontal and vertical image component pick-up units and peripheral units thereof.

As shown in FIG. 3, a conventional image pick-up unit 30 includes two right-angled prisms 31 and 32, the hypotenuses of which are joined to each other to form a reflection surface that can reflect an incident two-dimensional image. A plano convex lens 33 has a flat surface which faces the reflection surface of the two right-angled prisms 31 and 32, and condenses the reflected image into a one-dimensional image component. A line CCD 34 converts the one-dimensional image component into electrical signals.

The basic principle of picking up an image is to reflect a two-dimensional image horizontally or vertically by two prisms 31 and 32, to condense the reflected two-dimensional image into a one-dimensional image through the plano convex lens 33, and to pick-up the one-dimensional image component in the line CCD 34.

As shown in FIG. 4, a horizontal/vertical pick-up unit 40 is made up of two image component pick-up units. A horizontal component pick-up unit, made up of a horizontal pair of prisms 41 and 42, a horizontal plano convex lens 43, and a horizontal line CCD 44, receives a two-dimensional image and outputs horizontal component data. A vertical component pick-up unit, made up of a vertical pair of prisms 45 and 46, a vertical piano convex lens 47, and a vertical line CCD 48, receives a two-dimensional image and outputs vertical component data.

There is an orientation difference of 90° between the horizontal component pick-up unit (41, 42, 43 and 44), and the vertical component pick-up unit (45, 46, 47 and 48). As shown in FIG. 4, the horizontal/vertical image pick-up unit 40 reflects light input from a camera lens vertically and horizontally through corresponding right-angled prisms pairs 41, 42 and 45, 46, respectively. The vertically reflected image and the horizontally reflected image are condensed through corresponding piano convex lenses 43 and 47, respectively, and finally converted into electrical signals in horizontal and vertical line CCDs 44 and 48, respectively.

Assuming that an input image is picked up by both the horizontal line CCD 44 and the vertical line CCD 48, and that the length (number of registers) of the horizontal line CCD 44 is M, and the length of the vertical line CCD 48 is N, the resultant image components can be represented by the following equations:

$$P_h(x) = \alpha \sum_{y=0}^{N-1} I(x, y) \quad (2)$$

$$P_v(y) = \alpha \sum_{x=0}^{M-1} I(x, y) \quad (3)$$

where, (x, y) are the coordinates of a pixel from the image, I (x, y) is the brightness of the pixel, and $P_h$ and $P_v$ are the vertically and horizontally condensed components, respectively. The variable $\alpha$ is a reflection coefficient for light incident upon the reflection surface of the pair of prisms. The horizontal and vertical component images, which have been linearly condensed, are converted into electrical signals in the horizontal and vertical line CCDs 44 and 48, respectively, and are output to circuits for detecting motion vectors.

The conventional image component pick-up unit just described still faces problems such as a complicated construction and a large size. Accordingly, a need exists for an image component pick-up unit which overcomes the above-mentioned problems.

SUMMARY OF THE INVENTION

The present invention has been made in an effort to solve one or more of the problems with the conventional motion correction devices, including those mentioned above. To provide a simple construction and small-sized pick-up unit, thin transmitter-reflectors are used instead of a pair of right angle prisms.

To achieve these and other advantages, the present invention provides for a motion correction device, for images recorded from incident light having an incident direction, comprising at least one of horizontal and vertical component pick-ups, each component pick-up comprising a converter for converting light into electrical signals, and a thin transmitter-reflector for transmitting a portion of the incident light at substantially the incident direction and for reflecting a remaining portion of the incident light at a range of other directions such that substantially all the reflected light impinges on the converter. In another aspect of the invention, a curved mirror is used as the thin transmitter-reflector.

In other aspects of the invention the motion correction device further comprises a condenser and uses a flat mirror as the thin transmitter-reflector.

In still other aspects of the invention, the motion correction device further comprises motion component detectors whereby a motion vector signal is defined, and a control means responsive to the motion vector signal for changing color/brightness signals.

BRIEF DESCRIPTION OF THE DRAWINGS

The features and advantages of the invention will be described with reference to the accompanying drawings, in which.

DETAILED DESCRIPTION OF THE PREFERRED EMBODIMENTS

Reference will now be made in detail to preferred embodiments of the present invention, examples of which are illustrated in the accompanying drawings.

Figure 1:
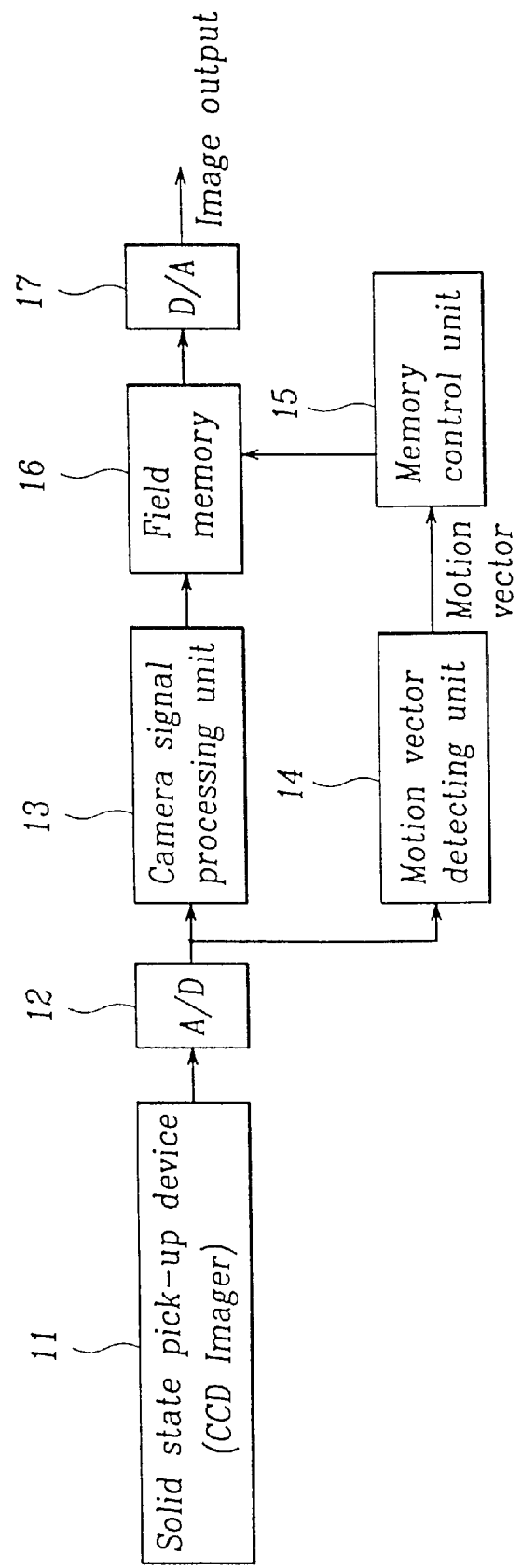
FIG. 1 is a block diagram which shows a conventional image correction system.
Figure 2:
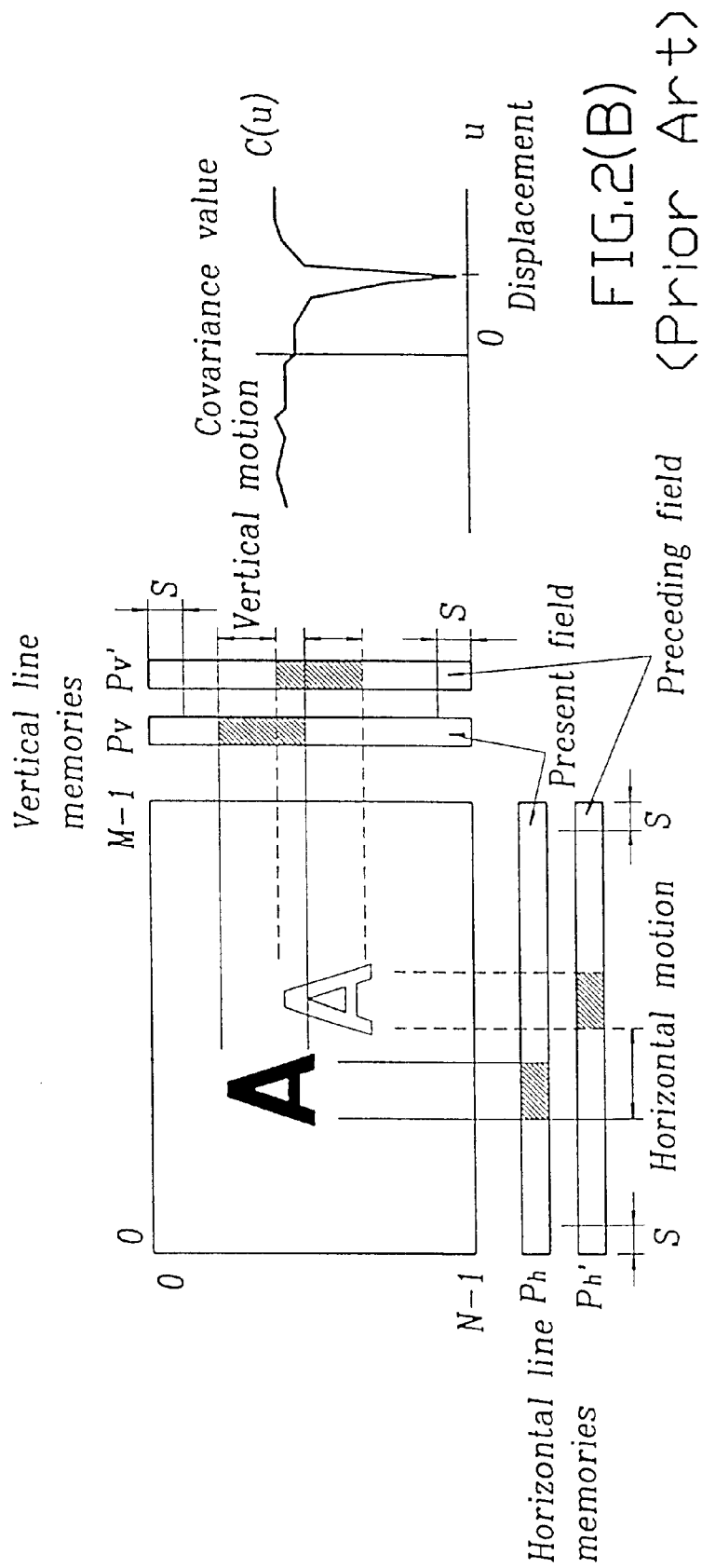
FIGS. 2(A) and 2(B) are each a conceptual diagram which show a conventional method of one-dimensionally detecting a motion vector of an image.
Figure 3:
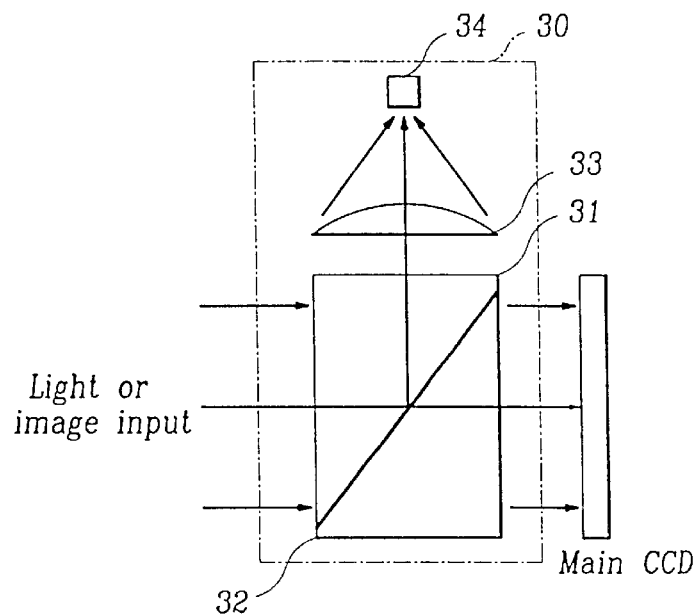
FIG. 3 is a schematic diagram which shows the principle of picking up an image component through a conventional image pick-up unit.
Figure 4:
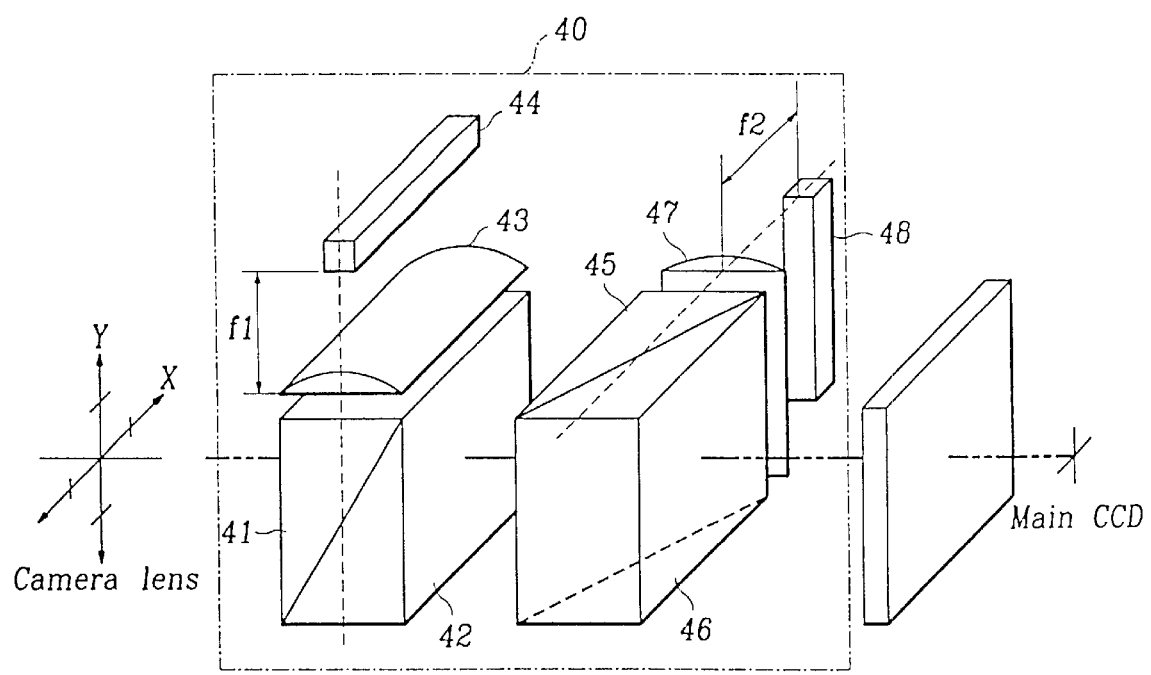
FIG. 4 is a schematic diagram which shows the conventional horizontal and vertical image component pick-up units and peripheral units.
Figure 5:
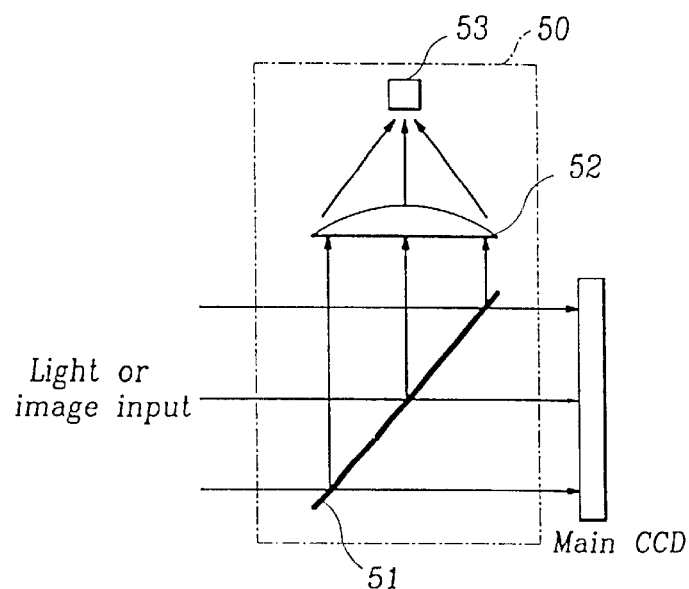
FIG. 5 is a schematic diagram which shows the principle of picking up an image through an image component pick-unit according to a first embodiment of the present invention.

Referring to FIG. 5, the image pick-up unit according to the first embodiment of the present invention comprises a thin transmission mirror 51 slanted at a given angle with respect to the angle of the incident light. The transmission mirror reflects incident light that forms a two-dimensional image at the given angle and simultaneously transmits the incident light at its incident angle. A condenser such as a piano convex lens 52 condenses the two-dimensional image reflected by the thin transmission mirror 51 into a one-dimensional image. A converter such as a line CCD 53, located where the output signal from condenser 52 is condensed into the one-dimensional component, converts the one-dimensional image component into electrical signals.

Figure 6:
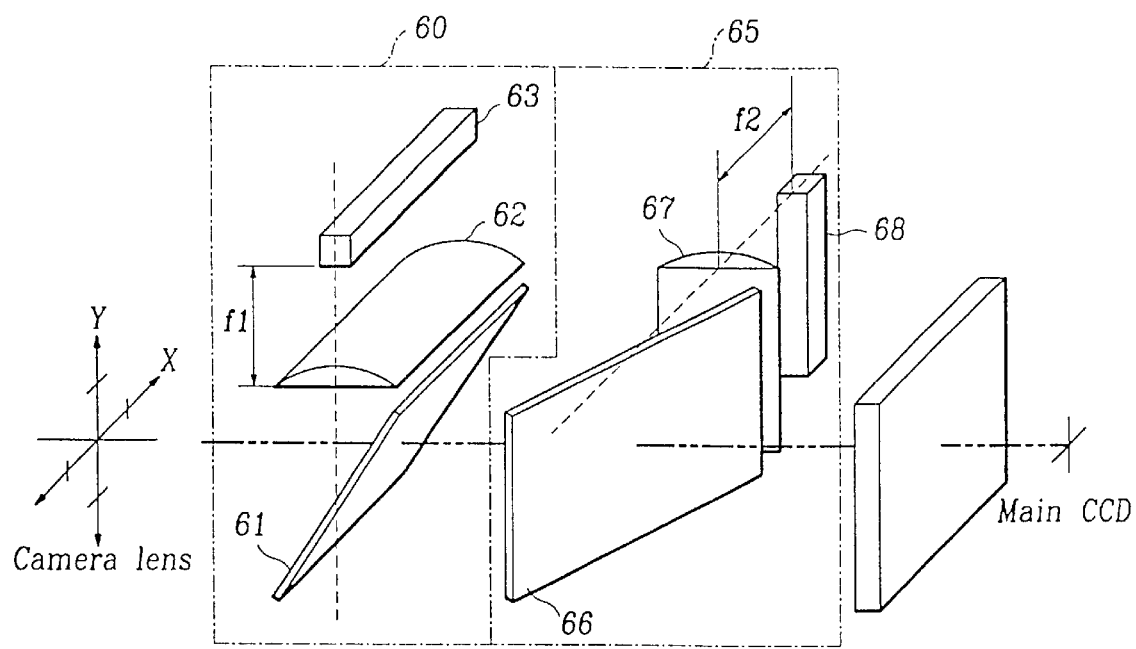
FIG. 6 is a schematic diagram which shows horizontal and vertical component pick-up units and peripheral units according to the first embodiment of the present invention.

In the first embodiment of the present invention, as shown in FIG. 6, there are two image component pick-up units, 60 and 65. A horizontal component pick-up unit 60, made up of a horizontal thin transmission mirror 61, a horizontal condenser 62, and a horizontal converter 63, receives a two-dimensional image and outputs one-dimensional horizontal component data. A vertical component pick-up unit 65, made up of a vertical thin transmission mirror 66, a vertical condenser 67, and a vertical converter 68, receives a two-dimensional image and outputs one-dimensional vertical component data. Together the horizontal component pick-up 60 and the vertical component pick-up form a horizontal/vertical image pick-up unit.

There is an orientation difference of 90° between the horizontal component pick-up unit 60 and the vertical component pick-up unit 65. Except for their orientation, the horizontal and vertical component pick-up units 60 and 65 are the same in their constitutions and functions as those of the image component pick-up unit 50 of FIG. 5. In other words, the functions of the horizontal transmission mirror 61 and the vertical transmission mirror 66 are the same as those of the transmission mirror 51 of FIG. 5 except for their orientation; the functions of the horizontal condenser 62 and the vertical condenser 67 are the same as those of the condenser 52 of FIG. 5 except for their orientation; and the functions of the horizontal converter 63 and the vertical converter 68 are the same as those of the converter 53 of FIG. 5 except for their orientation.

Referring to FIG. 6, the operations of the image component pick-up units 60 and 65 for detecting a motion vector according to the first embodiment of the present invention will now be described. Incident light from a camera lens forms a two-dimensional image that is simultaneously reflected at given horizontal and vertical angles and transmitted by the horizontal and vertical transmission mirrors 61 and 66, respectively. The images reflected from the horizontal and vertical transmission mirrors 61 and 66, respectively, are condensed into horizontal and vertical one-dimensional components by the horizontal and vertical plano convex lenses 62 and 67, respectively. The condensed horizontal and vertical components are converted to electrical signals by the horizontal and vertical line CCDs 63 and 68, respectively. The electrical signals from the horizontal and vertical line CCDs 63 and 68, respectively, are input to circuits for detecting a motion vector.

Figure 7:
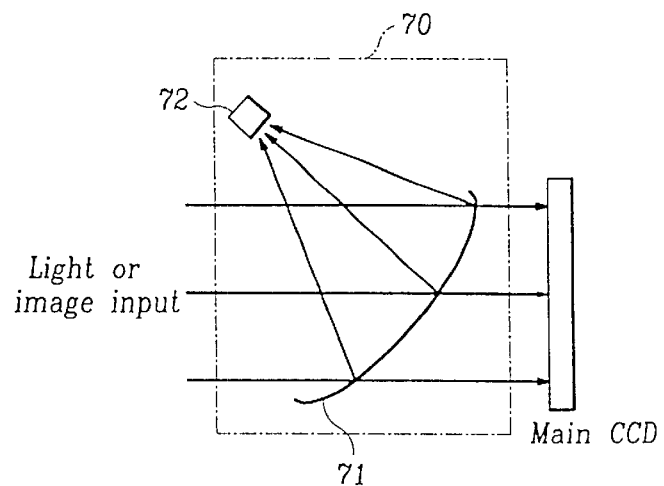
FIG. 7 is a schematic diagram which shows the principle of picking up an image through an image component pick-unit according to a second embodiment of the present invention.

Referring to FIG. 7, the image pick-up unit according to the second embodiment of the present invention comprises a curved thin transmission mirror 71 having a curved portion on its surface which simultaneously transmits incident light and reflects the incident light at a range of angles that focuses the two-dimensional image into a one-dimensional component. A line CCD 72, located where the reflected light is condensed into the one-dimensional component, converts the one-dimensional component into electrical signals.

Figure 8:
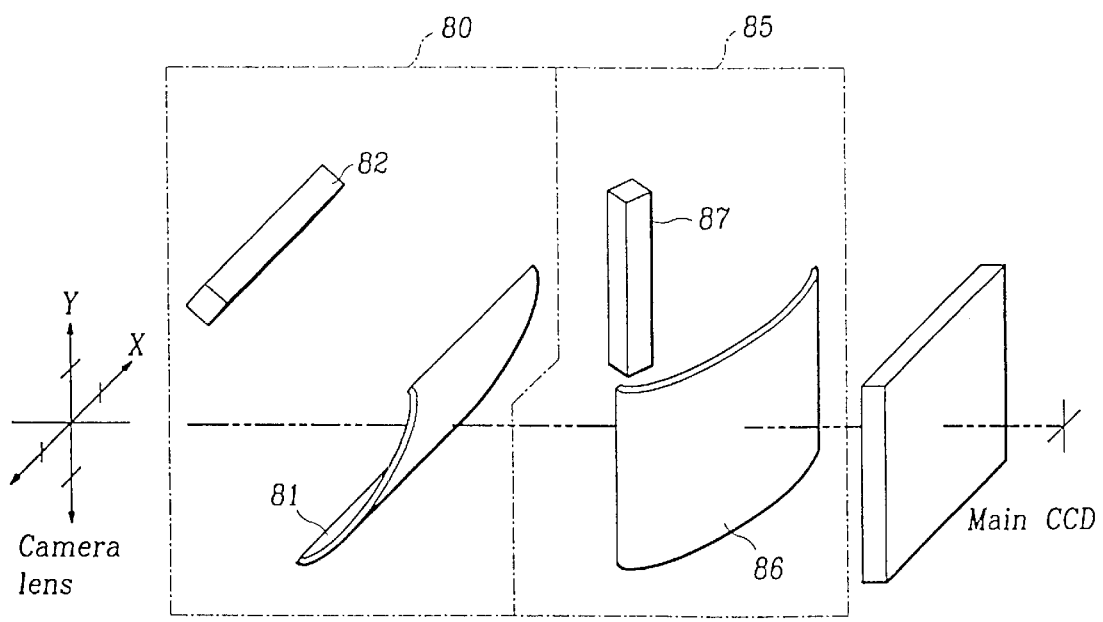
FIG. 8 is a schematic diagram which shows horizontal and vertical component pick-up units and peripheral units according to the second embodiment of the present invention.

In the second embodiment of the present invention, as shown in FIG. 8, there are two component pick-up units 80 and 85. A horizontal component pick-up unit 80 is made up of a horizontal curved thin transmission mirror 81 and a horizontal converter 82. A vertical component pick-up unit 85 is made up of a vertical curved thin transmission mirror 86 and a vertical converter 87. Together the horizontal component pick-up 80 and the vertical component pick-up 85 form a horizontal/vertical image pick-up unit.

Referring to FIG. 8, the operations of the image component pick-up units 80 and 85 for detecting a motion vector according to the second embodiment of the present invention will now be described. The horizontal and vertical curved thin transmission mirrors 81 and 86, simultaneously reflect and focus incident light from a camera lens that constitutes a two-dimensional image. The horizontal and vertical components are produced by the horizontal and vertical curved transmission mirrors 81 and 86, respectively, and are converted to electrical signals by horizontal and vertical line CCDs 82 and 87, respectively. The electrical signals output from the horizontal and vertical line CCDs 82 and 87 are input to circuits for detecting a motion vector.

As mentioned above, the flat thin transmission mirror is used in the component pick-up units 60 and 65 of the first embodiment of the present invention, and the curved thin transmission mirror is used in the component pick-up units 80 and 85 of the second embodiment of the present invention. Other flat and curved transmission reflectors can be substituted for the mirrors presented here without departing from the principles of the present invention. Also, other linear pick-up units and signal converters can be substituted without departing from such principles.

Figure 9:
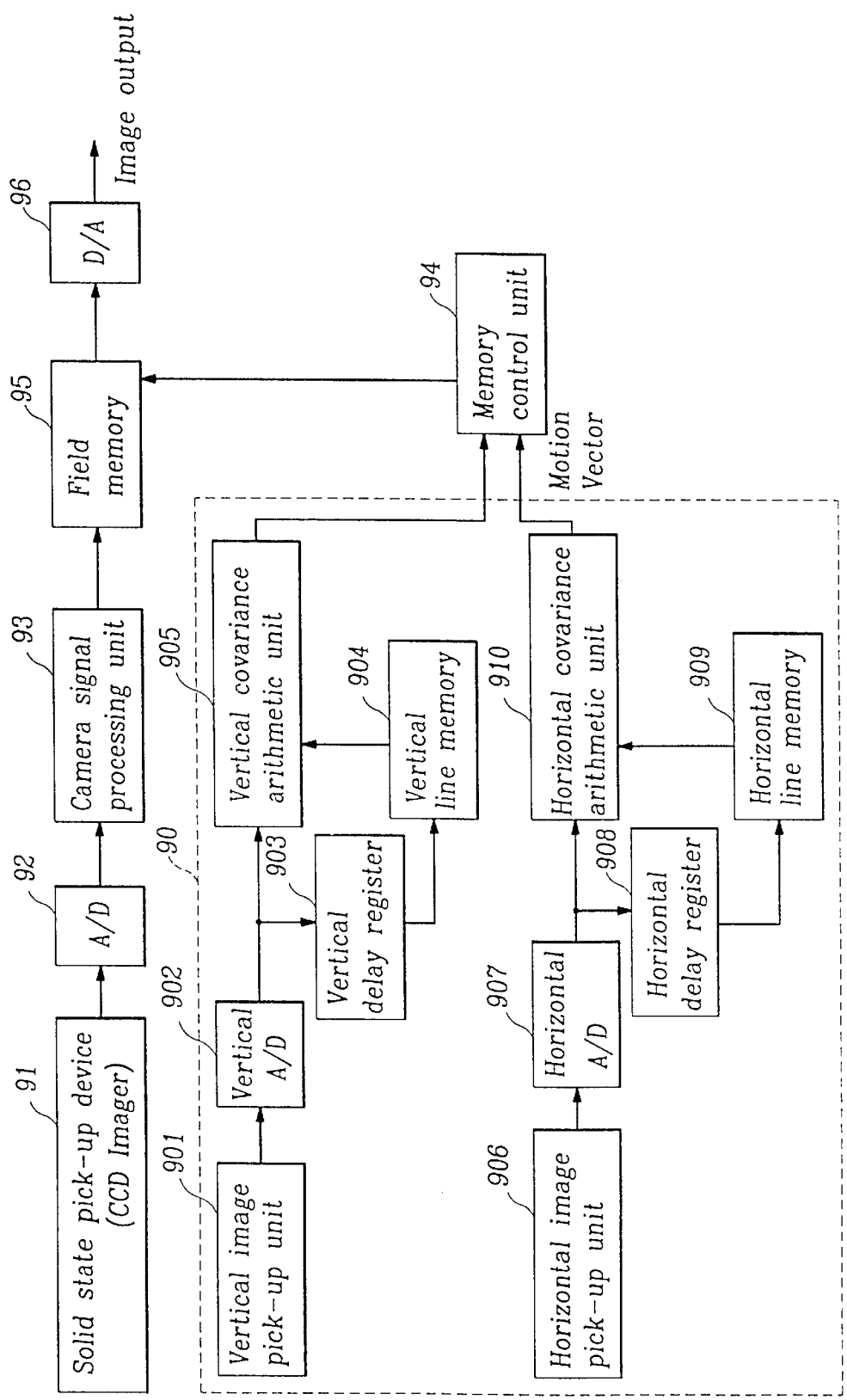
FIG. 9 is a block diagram which shows a third embodiment of the present invention including a motion vector detecting device of a camcorder.

FIG. 9 is a block diagram which shows a third embodiment of a motion correction device wherein an image correction system including a motion vector detector utilizes the component pick-ups of the present invention for a camcorder. As shown in FIG. 9, an image correction system uses a motion vector detector 90 including a vertical component pick-up unit 901 and a horizontal component pick-up unit 906. The system includes a solid state pick-up device, such as a CCD imager 91, which picks up incident light passing through an optical system to form an input image, and scans the image electronically to convert the image into system electrical signals. A system A/D converter 92 converts an analog signal output from the solid state pick-up device 91 into a system digital signal. A camera signal processing unit 93 converts a signal output from the system A/D converter into a color and brightness signal. The motion vector detector 90 receives the same image that is input to the solid state pick-up device 91 through horizontal and vertical image component pick-up units 901 and 906, respectively, and detects a motion vector caused by unstable hands. A memory control unit 94 receives a motion vector output from the motion vector detector 90 to control the position of pixels in a color and brightness signal. A field memory 95 holds a field unit (or a frame unit) of image color/brightness data and, according to image correction control by the memory control unit 94, outputs a stabilized image signal. A system D/A converter 96 converts a corrected color/brightness digital image signal output from the field memory 95 into an analog image signal to be output and recorded.

Figure 10:
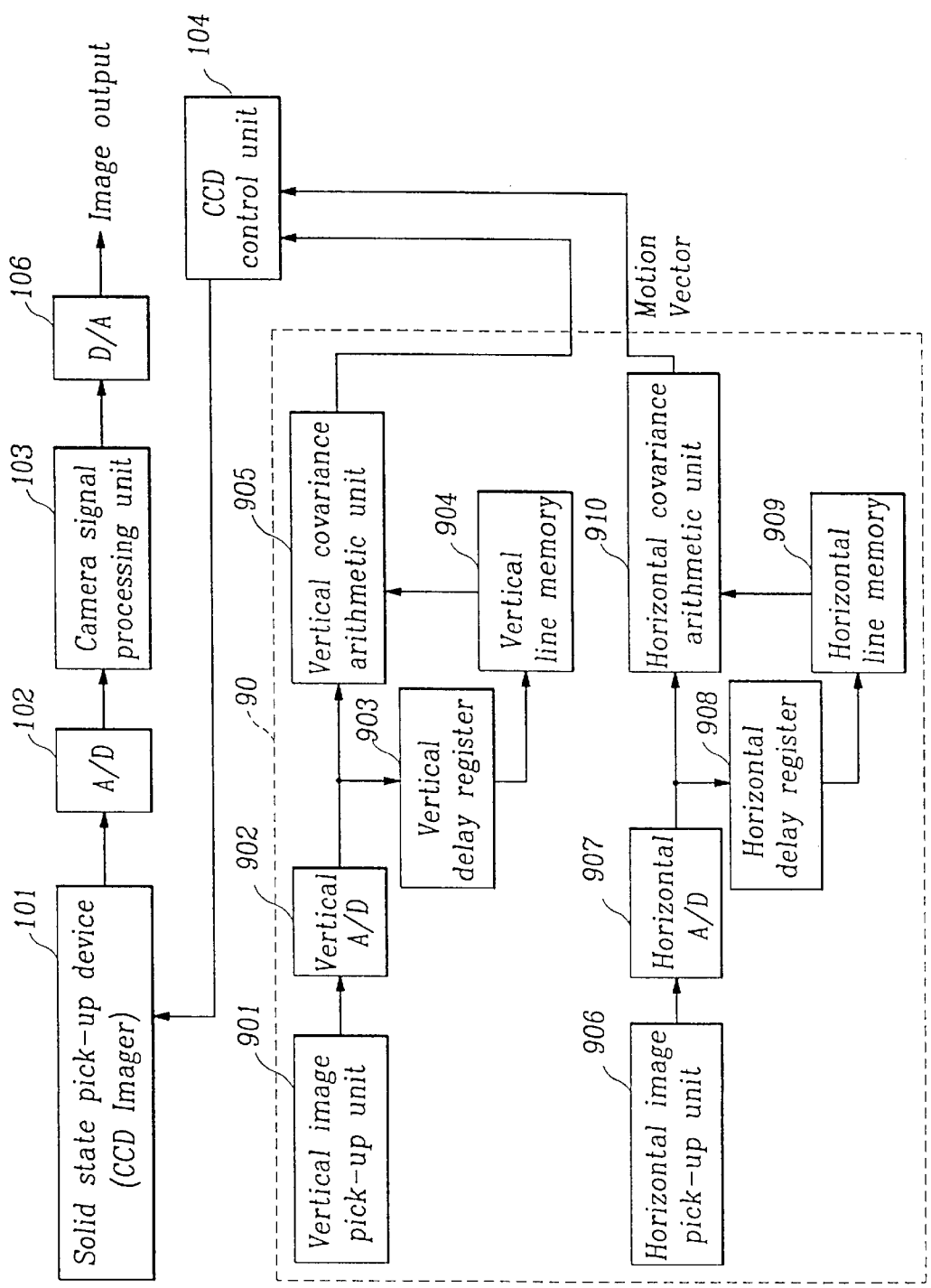
FIG. 10 is a block diagram which shows a fourth embodiment of the present invention including a motion vector detecting device of a camcorder.

FIG. 10 is a block diagram which shows a fourth embodiment of a motion correction device for a camcorder using a motion vector detector. The motion vector detector can utilize the component pick-ups of the present invention or conventional component pick-ups.

As shown in FIG. 10, the motion correction device of the fourth embodiment comprises a motion vector detector 90 which receives horizontal and vertical image components from component pick-up units 901 and 906, respectively. A solid state pickup control unit, such as a CCD control unit 104, receives a motion vector output from the motion vector detector 90 to control the position of pixels in the analog output of the solid state pick-up device 101. The solid state pick-up device 101 receives the same incident light through an optical system that is input to the motion vector detector 90 as a two-dimensional image, and according to a control signal output from the solid state pick-up control unit 104, converts the corrected image into system electrical signals. A system A/D converter 102 converts an analog signal output from the solid state pick-up device 101 into a system digital signal. A camera signal processing unit 103 converts the system digital signal output from the system A/D converter into a color and brightness signal. A system D/A converter 106 converts a digital image colorlbrightness signal into an analog image signal to be output and recorded.

In both the embodiments of the motion correction device depicted in FIG. 9 and FIG. 10 the motion vector detector has a vertical motion component detector and a horizontal motion component detector.

In the vertical motion component detector, a vertical component pick-up unit 901 simultaneously transmits and reflects incident light that forms the two dimensional image, vertically condenses the reflected image to provide the vertical component of the image, and converts the vertical component into electrical signals. A vertical A/D converter 902 converts the analog signal output from the vertical component pick-up unit 901 into a vertical digital signal. A vertical delay register 903 holds the vertical digital signal output from the vertical A/D converter 902 for a time during which pixels corresponding to half of a searching distance (S in Equation 1) are processed, then outputs the signal. A vertical line memory 904 holds the vertical digital signal output from the vertical delay register 903. A vertical covariance arithmetic unit 905 receives the vertical digital signal output from the vertical A/D converter 902 and the delayed vertical digital signal from the vertical line memory 904, and calculates covariance values between the two signals to output a vertical displacement signal which is the vertical component of the motion vector.

In the horizontal motion component detector, a horizontal component pick-up unit 906 simultaneously transmits and reflects incident light that forms the two dimensional image, horizontally condenses the reflected image to provide the horizontal component of the image, and converts the horizontal component into electrical signals. A horizontal A/D converter 907 converts the analog signal output from the horizontal component pick-up unit 906 into a horizontal digital signal. A horizontal delay register 908 holds the horizontal digital signal output from the horizontal A/D converter 907 for a time during which pixels corresponding to half of a searching distance are processed, then outputs the signal. A horizontal line memory 909 holds the horizontal digital signal output from the horizontal delay register 908. A horizontal covariance arithmetic unit 910 receives the horizontal digital signal output from the horizontal A/D converter 907 and the delayed horizontal digital signal from the horizontal line memory 909, and calculates covariance values between the two signals to output a horizontal displacement signal which is the horizontal component of the motion vector.

In the preferred embodiments, the vertical component pick-up unit 901 of the motion vector detector 90 in FIG. 9 and FIG. 10 uses the vertical component pick-up unit 65 in FIG. 6 and the vertical component pick-up unit 85 in FIG. 8, respectively. The horizontal component pick-up unit 906 of the motion vector detector 90 in FIG. 9 and FIG. 10 uses the horizontal component pick-up unit 60 in FIG. 6 and the horizontal component pick-up unit 80 in FIG. 8, respectively.

Assuming that an input image is picked up in both the horizontal line CCD 63 or 82 and the vertical line CCD 68 or 87, and that the number of registers of the horizontal line CCD 63 or 82 is M, and the number of registers of the vertical line CCD 68 or 87 is N, the component results still can be represented by equations (2) and (3), above. Here the variable a is a reflection coefficient for light incident upon the flat transmission mirrors 61 and 66 or the curved transmission mirrors 81 and 86. A one-dimensional image, which has been linearly condensed, is converted into electrical signals in the horizontal and vertical line CCDs 63 and 82 or 68 and 87, respectively, and is input to circuit 902 or 907, respectively, for detecting motion vectors.

As shown in FIG. 9, one-dimensional image components $P_h$ and $P_v$ output from the horizontal and vertical component pick-up units 906 and 901, respectively, are converted into digital signals through the horizontal and vertical A/D converters 907 and 902. Further, in the horizontal and vertical covariance arithmetic units 910 and 905, through an equation such as equation (1), the covariance calculation is carried out between one-dimensional image components of the preceding field from the horizontal and vertical line memories 909 and 904, and digital image signals from the horizontal and vertical A/D converters 907 and 902. A location which results in the minimum covariance value among the calculated covariance values is presumed to be the optimum displacement of the image. Further, the memory control unit 94, after receiving horizontal and vertical components of the motion vector from the motion vector detector 90, sends a signal for correcting the image to the field memory 95 which holds an unstable color/brightness image.

An incident image input to the system solid state pick-up device such as a CCD imager 91 is converted to system electrical signals which go through the A/D converter 92. The resulting system digital signals go through the camera signal processing unit 93, which outputs color/brightness signals which are stored in the field memory 95. The initial locations of pixels of the image in the field memory 95 are changed under the control of the memory control unit 94. The field memory 95 then outputs a corrected image. The corrected image output from the field memory 95 goes through the system D/A converter 96 to be converted into an analog signal, which will be recorded in a videocassette recorder or output as an image. The same image that is input to the system solid state pick-up 91 is input to the horizontal and vertical component pick-up units 906 and 901, which process the input image independently of each other and simultaneously.

As shown in FIG. 10, a system solid state pick-up device 101, a system A/D converter, a camera signal processing unit 103, and a D/A converter 106 of the fourth embodiment are similar in their constitutions and functions as those of the third embodiment of FIG. 9.

The motion vector detector 90, after receiving the same image that is input to the system solid state pick-up device 101 as mentioned above, can independently detect a motion vector. Thus, as soon as an image is picked up in the system solid state pick-up device 101, a solid state pick-up control unit such as a CCD control unit 104, after receiving a motion vector output from the motion vector detector 90, can directly control the image in the system solid state pick-up device 101 to output a corrected image. Accordingly, the field memory 95 of FIG. 9 is not required in this case.

As described above, in the process of correcting an unstable image caused by unsteady hands, the preferred embodiments of the present invention provide a small-sized and simple construction of a motion correction device for images in camcorders since one-dimensional image component data, which are necessary for image correction, are simply obtained through the flat or curved thin transmission mirrors.

Having described and illustrated the principles of the present invention in the preferred embodiments, it should be apparent to those skilled in the art that the invention can be modified in arrangement and detail without departing from the technical spirit and scope of the present invention as defined by the appended claims and their equivalents.

What is claimed is:

1. A motion correction device for images recorded from incident light having an incident direction, comprising at least one of horizontal and vertical component pick-ups, each component pick-up comprising:

a converter for converting light into electrical signals; and a transmitter-reflector consisting of a curved half-mirror having a concave surface on which the light is incident upon, said half-mirror being curved in only two dimensions, and said half-mirror being oriented relative to the incident light and said converter so as to transmit a portion of the incident light at substantially the incident direction and reflect a remaining portion of the incident light at a range of other directions such that substantially all the reflected light is focused by the concave surface of the half-mirror in only one dimension on said converter.

2. The motion correction device of claim 1, wherein said converter is a line charge coupled device.

3. The motion correction device of claim 1, wherein said thin transmitter-reflector is a curved transmission mirror for focusing the reflected light on said converter.

4. The motion correction device of claim 1, further comprising at least one of horizontal and vertical motion component detectors, each of said motion component detectors comprising:

an analog/digital converter which converts said electrical signals into digital signals;

a delay register which holds said digital signals for a predetermined holding duration and then outputs said digital signals;

a line memory which stores said digital signals output from said delay register;

an arithmetic unit which receives said digital signals from said analog/digital converter and retrieves said digital signals from said line memory and outputs a displacement signal related to a displacement of minimum covariance between said received signals and said retrieved signals.

5. The motion correction device of claim 4, comprising both of said horizontal and vertical component pick-ups and both of said horizontal and vertical motion component detectors, wherein:

said converter of said vertical component pick-up is substantially perpendicular to said converter of said horizontal component pick-up;

said horizontal motion component detector is connected to said horizontal component pick-up; and, said vertical motion component detector is connected to said vertical component pick-up, whereby said displacement signal of said horizontal motion component detector and said displacement signal of said vertical motion component detector define a motion vector signal.

6. The motion correction device of claim 5, further comprising:

a two-dimensional solid state pick-up device for converting incident light transmitted through said thin transmitter-reflector of said horizontal component pick-up and through said thin transmitter-reflector of said vertical component pick-up into system electrical signals;

a system analog/digital converter which converts said system electrical signals into system digital signals;

a camera signal processing unit which converts said system digital signals into color/brightness signals;

a system digital/analog converter for converting signals derived from said color/brightness signals into an analog image signal to be recorded; and, a control means responsive to said motion vector signal for changing said color/brightness signals.

7. The motion correction device of claim 6, wherein said solid state pick-up device is a charge couple device imager.

8. The motion correction device of claim 7, wherein said control means is a charge couple device control unit connected to and controlling said charge couple device imager.

9. The motion correction device of claim 6, further comprising a field memory unit connected to said camera signal processing unit and connected to said system digital/analog converter for providing color/brightness signals to said system digital/analog converter.

10. The motion correction device of claim 9, wherein said control means is a memory control unit connected to and controlling said field memory unit.

* * * * *